United States Patent
Wang et al.

(10) Patent No.: US 12,305,627 B2
(45) Date of Patent: May 20, 2025

(54) CRANKSHAFT, COMPRESSOR, AND REFRIGERATION DEVICE

(71) Applicant: ANHUI MEIZHI COMPRESSOR CO., LTD., Anhui (CN)

(72) Inventors: Chengcheng Wang, Anhui (CN); Gang Huang, Anhui (CN); Dongdong Song, Anhui (CN)

(73) Assignee: ANHUI MEIZHI COMPRESSOR CO., LTD., Anhui (CN)

( * ) Notice: Subject to any disclaimer, the term of this patent is extended or adjusted under 35 U.S.C. 154(b) by 559 days.

(21) Appl. No.: 17/675,378

(22) Filed: Feb. 18, 2022

(65) Prior Publication Data

US 2022/0170449 A1 Jun. 2, 2022

Related U.S. Application Data

(63) Continuation of application No. PCT/CN2020/121599, filed on Oct. 16, 2020.

(30) Foreign Application Priority Data

Nov. 22, 2019 (CN) .......................... 201911158468.2

(51) Int. Cl.
*F16C 3/14* (2006.01)
*F04B 35/04* (2006.01)
(Continued)

(52) U.S. Cl.
CPC .......... *F04B 39/0094* (2013.01); *F04B 35/04* (2013.01); *F04B 53/006* (2013.01); *F04B 53/18* (2013.01); *F16C 3/14* (2013.01)

(58) Field of Classification Search
CPC ........ F16C 3/14; F04B 35/04; F04B 39/0094; F04B 53/006; F04B 53/18
(Continued)

(56) References Cited

U.S. PATENT DOCUMENTS

| 4,325,679 A * | 4/1982 | Smith ................. F04B 39/0246 417/372 |
| 4,493,226 A * | 1/1985 | Andrione ............ F04B 39/0094 74/595 |
| 2014/0109364 A1* | 4/2014 | Junker .................. B23B 29/248 29/6.01 |

FOREIGN PATENT DOCUMENTS

| CN | 2931908 Y | 8/2007 |
| CN | 102272453 A | 12/2011 |

(Continued)

OTHER PUBLICATIONS

International Search Report dated Jan. 18, 2021 issued in PCT/CN2020/121599.

(Continued)

*Primary Examiner* — William C Joyce
(74) *Attorney, Agent, or Firm* — Scully, Scott, Murphy & Presser, P.C.

(57) ABSTRACT

A crankshaft is provided. The crankshaft has a first shaft, a second shaft and a first crank arm. A first oil passage is formed in the first shaft along an axis direction of the shaft. A second oil passage is formed in the second shaft along an axis direction of the shaft. The first crank arm is configured to be connected between the first shaft and the second shaft. The first crank arm is provided with a third oil passage. The third oil passage is configured to communicate the first oil passage and the second oil passage. The second shaft is eccentrically provided relative to the axis of the first shaft. A compressor having the crankshaft and a refrigeration device having the compressor are also provided.

18 Claims, 4 Drawing Sheets

(51) Int. Cl.
*F04B 39/00* (2006.01)
*F04B 53/00* (2006.01)
*F04B 53/18* (2006.01)

(58) Field of Classification Search
USPC .......................................................... 29/6.01
See application file for complete search history.

(56) References Cited

FOREIGN PATENT DOCUMENTS

| | | |
|---|---|---|
| CN | 104895764 A | 9/2015 |
| CN | 105041610 A | 11/2015 |
| CN | 106337872 A | 1/2017 |
| CN | 206054225 U | 3/2017 |
| CN | 206221259 U | 6/2017 |
| CN | 107288845 A | 10/2017 |
| CN | 208816288 U | 5/2019 |
| JP | S56147914 A | 11/1981 |
| JP | 66435121 A | 2/1989 |
| JP | H0211872 A | 1/1990 |
| JP | H09209936 A | 8/1997 |
| JP | 2005180369 A | 7/2005 |
| JP | 2007132292 A | 5/2007 |
| WO | 2007145397 A1 | 12/2007 |
| WO | 2016119869 A1 | 8/2016 |

OTHER PUBLICATIONS

Chinese First Search Report dated Nov. 22, 2019 issued in CN 201911158468.2.
Chinese First Office Action dated Sep. 10, 2021 issued in CN 201911158468.2.
Chinese Second Office Action dated Dec. 20, 2021 issued in CN 201911158468.2.
Supplementary European Search Report dated Sep. 13, 2022 received in European Patent Application No. 20889071.5.

* cited by examiner

CRANKSHAFT, COMPRESSOR, AND REFRIGERATION DEVICE

CROSS-REFERENCE TO RELATED APPLICATIONS

The present application is a continuation application of PCT International Application No. PCT/CN2020/121599, filed on Oct. 16, 2020, which claims priority to and benefits of Chinese Patent Application No. 201911158468.2, filed with China National Intellectual Property Administration on Nov. 22, 2019 and entitled "CRANKSHAFT, COMPRESSOR, AND REFRIGERATION DEVICE", the entire contents of which are herein incorporated by reference for all purposes. No new matter has been introduced.

FIELD

The present application relates to the technical field of refrigeration devices, and particularly relates to a crankshaft, a compressor, and a refrigeration device.

BACKGROUND

At present, fixed-speed reciprocating compressors are generally molded by casting. In order to meet the displacement requirements of different reciprocating compressors, crankshafts need to have different eccentricities and shaft diameters, but re-molding is required in planning crankshafts with different eccentricities and shaft diameters. As a result, the molds for casting crankshafts have low standardization and poor versatility, and the manufacturing cost is increased.

SUMMARY

The present application aims to solve one of the technical problems existing in the prior art or the related art.

To this end, a first aspect of the present application proposes a crankshaft.

A second aspect of the present application proposes a compressor.

A third aspect of the present application proposes a refrigeration device.

In view of this, a crankshaft is proposed according to an embodiment of the first aspect of the present application, comprising: a first shaft, a second shaft and a first crank arm, a first oil passage being formed in the first shaft along an axis direction thereof; a second oil passage being formed in the second shaft along an axis direction thereof; the first crank arm being configured to be connected between the first shaft and the second shaft, the first crank arm being provided with a third oil passage, and the third oil passage being configured to communicate the first oil passage with the second oil passage, wherein the second shaft is eccentrically provided relative to an axis of the first shaft.

The crankshaft provided in the present application comprises a first shaft, a second shaft and a first crank arm. By providing a first oil passage in the first shaft along the axis direction thereof and a second oil passage in the second shaft along the axis direction thereof, and making the first oil passage and the second oil passage communicate with each other through a third oil passage on the first crank arm, lubricating oil can be supplied to the second oil passage after passing through the first oil passage and the third oil passage. Moreover, the first crank arm is used to connect the first shaft and the second shaft, i.e., the second shaft and the first shaft are independent of each other and are separate parts, and are subsequently assembled together through the first crank arm; and the second shaft is eccentrically provided relative to the axis of the first shaft, i.e., the axis of the second shaft is parallel, but not co-linear, with the axis of the first shaft, so that it is possible to adjust the eccentricity according to the actual displacement requirements of the compressor, and adjust the relative position of the second shaft and the first shaft, to enable the crankshaft to adapt to the displacement requirements of different compressors, e.g., fixing the first shaft and the first crank arm, while moving the second shaft in the eccentric direction to obtain crankshafts with different eccentricities. Compared with the related art in which the first shaft and the second shaft are casted in one piece and an oil supply channel needs to be processed on the outer surface of the crankshaft, this disclosure improves the versatility of crankshaft parts, and enables oil supply channels and crankshafts with different eccentricity requirements to be processed without the need of processing devices with complex functions or diverse structures, which simplifies the processing and reduces the production cost.

In addition, the crankshaft in the above embodiment provided according to the present application may also have the following additional technical features.

In some embodiments, the crankshaft further comprises: a second crank arm configured to connect the second shaft to the first crank arm, the second crank arm being provided with a fourth oil passage for communicating the second oil passage with the third oil passage.

In these embodiments, the crankshaft further comprises a second crank arm; the second shaft, the second crank arm, the first crank arm and the first shaft are connected sequentially; and lubricating oil enters the second oil passage after passing through the first oil passage, the third oil passage and the fourth oil passage, thus realizing oiling.

In some embodiments, the first crank arm is integrally molded with the first shaft. The second crank arm is integrally molded with the second shaft. The first crank arm and the second crank arm are connected together. By making the first crank arm integrally molded with the first shaft, making the second crank arm integrally molded with the second shaft, and then connecting the first crank arm and the second crank arm together to realize the assembly of the crankshaft, processing is simplified and modularized, and the displacement requirements of different compressors can also be met, especially in the case where the second crank arm can be connected to the first crank arm under high displacement requirements, the production efficiency of the crankshaft is improved.

Alternatively, the first crank arm may also be welded to the first shaft, and the second crank arm may also be welded to the second shaft.

In some embodiments, the first crank arm is integrally forged with the first shaft; and/or the second crank arm is integrally forged with the second shaft. The molding is simple, the processing and manufacturing process is mature, the production efficiency and the material utilization rate are high, and the cost can be reduced while ensuring the quality of the crankshaft parts. Compared with the related art in which the crankshaft is processed by a casting process and then oil supply channels need to be processed subsequently on the outer surface of the crankshaft, the processing of the crankshaft by a forging process can quickly realize the first crank arm with certain accuracy and the first shaft with the first oil passage, and the second crank arm and the second shaft with the second oil passage, which enables direct forging molding of the oil passages, improving the production efficiency. Moreover, one set of forging molds can meet the requirements of the crankshafts with different eccentricities, making the molds very versatile and reducing the development costs and the manufacturing costs. In addition, it also eliminates the pollution to the environment and the large consumption of energy caused by using a metal casting thermoforming process.

Alternatively, the first crank arm and the first shaft can also be integrally molded by turning, etc. Similarly, the second crank arm and the second shaft can also be integrally molded by turning.

In some embodiments, the first crank arm and the second crank arm are welded together by electric resistance welding.

In these embodiments, the first crank arm and the second crank arm are connected together by electric resistance welding. Electric resistance welding enables electric fusion of a welding strip into one side of the first crank arm towards the second crank arm, which makes the connection convenient and firm, does not cause the second crank arm to be warped relative to the first crank arm, and facilitates firm arrangement of the second crank arm in a proper position of the first crank arm, thereby adjusting the eccentricity of the second shaft relative to the first shaft. The second crank arm needs to be welded in such a way that it can be welded to the first crank arm under all eccentric conditions of the crankshaft, thereby ensuring the versatility of the crankshaft parts.

In some embodiments, the first crank arm and the second crank arm are welded together by laser welding. The connection is easy and strong.

In some embodiments, in any one of cross sections of the first shaft, the first oil passage does not have a constant wall thickness.

In these embodiments, by setting that in any one of cross sections of the first shaft, the first oil passage does not have a constant wall thickness, i.e., the first oil passage has a relatively thin-walled part and a relatively thick-walled part between the first oil passage and the outer surface of the first shaft, the cross section of the first oil passage is not a circular hole but, for example, a triangular hole, an elliptical hole or a gourd-shaped hole, etc., or the cross section of the first oil passage is a circular hole but its center of circle deviates from the axis of the first shaft. During the rotation of the crankshaft, since the wall thickness of the first oil passage is not always the same in a circumferential direction, the centrifugal force generated is not always the same, so that lubricating oil can be applied through a relatively thin-walled part under the action of centrifugal force, and enters the first oil passage and the second oil passage for lubrication, achieving good oiling effect and good lubricating effect. Compared with the practice in the related art that in order to ensure the oiling volume and the structural strength of the crankshaft, the diameter of the crankshaft is designed to be relatively large to enable the oil passage to have a relatively large diameter so as to ensure sufficient centrifugal force and thus ensure the oiling volume, this disclosure can achieve a crankshaft with a small volume while improving the oiling volume of the crankshaft and ensuring the structural strength.

In some embodiments, in any one of cross sections of the first shaft, the first oil passage has an axisymmetric structure.

In these embodiments, by designing the first oil passage to have an axisymmetric structure, e.g., an ellipse, a cross pattern, etc., in any one of cross sections of the first shaft, the oiling volume can be ensured while facilitating processing of the first oil passage.

In some embodiments, in any one of cross sections of the first shaft, the first oil passage has an axisymmetric profile hole structure. This can ensure that the wall thickness of the first oil passage varies drastically, thereby ensuring that the first shaft can generate sufficient centrifugal force to guide application of lubricating oil.

In some embodiments, in any one of cross sections of the first shaft, the first oil passage has a thin-walled section and a thick-walled section in a circumferential direction; and in the circumferential direction of the first oil passage, the second shaft is provided eccentrically relative to the axis of the first shaft, avoiding an orientation of the thin-walled section.

In these embodiments, there are a thin-walled section and a thick-walled section in any one of cross sections of the first shaft, wherein the thin-walled section is by default the thinnest section and the thick-walled section is the section with the largest wall thickness. That is, the thickness of any thin-walled section is less than the thickness of any thick-walled section. The number of thin-walled sections may be one or more, and similarly, the number of thick-walled sections may be one or more. By providing the second shaft eccentrically relative to the axis of the first shaft, avoiding the orientation of the thin-walled section, in the circumferential direction of the first oil passage, i.e., in any one of cross sections of the first shaft, the shortest connecting line between the projection of the axis of the second shaft on this cross section and the axis of the first shaft and the shortest connecting line between the projection of the midpoint of the thin-walled section on this cross section and the axis of the first shaft do not overlap, it is possible to prevent the centrifugal force brought by the second shaft from affecting the thin-walled section of the first shaft, thus preventing the thin-walled section from breaking and damaging, etc., and ensuring the structural strength of the thin-walled section, thereby further enabling a crankshaft with a small volume to have a relatively high oiling volume.

In some embodiments, in any one of cross sections of the first shaft, an angle between the shortest connecting line between the axis of the second shaft and the axis of the first shaft and the shortest connecting line between the midpoint of the thin-walled section and the axis of the first shaft is larger than or equal to 90°. This enables the second shaft to be sufficiently spaced from the thin-walled section in the circumferential direction of the first oil passage, effectively preventing the eccentric movement of the second shaft relative to the first shaft from affecting the thin-walled section of the first shaft, and ensuring that the structural strength of the thin-walled section of the second shaft meets the requirements of the crankshaft.

In some embodiments, the angle between the above two shortest connecting lines may be 90°, 120° or 180°, etc. This may be determined based on the wall thickness and the position of the thin-walled section.

In some embodiments, an inner contour of the thin-walled section is a first circular arc and an inner contour of the thick-walled section is a second circular arc, the first circular arc and the second circular arc open towards the axis of the first shaft.

In these embodiments, it is defined that in any one of cross sections of the first shaft, the inner contour of the thin-walled section is a first circular arc and the inner contour of the thick-walled section is a second circular arc, which facilitates processing and quick application of lubricating oil. In addition, by making the first circular arc and the second circular arc open towards the axis of the first shaft, the first oil passage is made to have a relatively large space, which facilitates more lubricating oil entering the first oil passage, improves the lubricating effect, and also facilitates the processing of the first oil passage.

In some embodiments, a wall thickness of the thin-walled section is larger than or equal to 0.3 mm; and/or an arc length of the first circular arc ranges from 3 mm to 5 mm; and/or a difference between a radius corresponding to the first circular arc and a radius corresponding to the second circular arc ranges from 0 mm to 2 mm.

In these embodiments, by making the wall thickness of the thin-walled section larger than or equal to 0.3 mm, e.g., between 0.4 mm and 0.5 mm, it is ensured that the thin-walled section has sufficient structural strength. Further, by making the arc length of the first circular arc larger than 0 mm, e.g., between 3 mm and 5 mm, it is ensured that the thin-walled section has sufficient oiling volume. In addition, by making the difference between the radius corresponding to the first circular arc and the radius corresponding to the second circular arc larger than or equal to 0 mm, e.g., between 1 mm and 2 mm, wherein if the difference between the two radii is 0, the cross section of the first oil passage has a circular hole structure and the first oil passage is eccentrically provided relative to the axis of the first shaft, sufficient centrifugal force can be generated during the rotation of the first shaft to guide the application of lubricating oil.

In some embodiments, the first oil passage further has a transition section connecting the thin-walled section and the thick-walled section. Further, an inner contour of the transition section has a first straight line.

In these embodiments, it is defined that there is a transition section to connect the thin-walled section and the thick-walled section in any one of cross sections of the first shaft, and in this way, it is possible to moderate the thickness variation of the first shaft and improve the structural strength of the first shaft.

In some embodiments, the transition section comprises a first straight line, e.g., it is tangent to the first circular arc and the second circular arc, respectively; and alternatively, it may not be tangent to the first circular arc and the second circular arc; and the transition section may also comprise a fifth circular arc, through which the first straight line connects the first circular arc and the second circular arc.

In some embodiments, a first tangent is made at an intersection of the first circular arc and the first straight line, a second tangent is made at an intersection of the second circular arc and the first straight line, and an angle between the first tangent and the second tangent facing an interior of the first shaft is larger than 90°. This ensures that the first oil passage has enough space inside to ensure the oiling volume. Alternatively, the angle between the first tangent and the second tangent facing the interior of the first shaft may also be smaller than 90°.

In some embodiments, an inner contour of the thin-walled section is a third circular arc and an inner contour of the thick-walled section is a fourth circular arc; one of the third circular arc and the fourth circular arc opens towards the axis of the first shaft, and the other opens away from the axis of the first shaft.

In some embodiments, a welding strip is provided at one end of the second crank arm away from the second shaft, and the second crank arm is welded, by electric resistance welding, to the first crank arm through the welding strip.

In these embodiments, by providing a welding strip at one end of the second crank arm away from the second shaft and connecting the second crank arm to the first crank arm by electric resistance welding, it is convenient to dispose the second crank arm at a position relative to the first crank arm according to different displacement requirements of the compressor. The welding strip can always be included on the first crank arm under all eccentricity conditions of the crankshaft.

In some embodiments, an outer contour of the welding strip has the same shape as an outer contour of the second crank arm; and/or a cross section of the welding strip is trapezoid-shaped or wedge-shaped.

In these embodiments, by setting the outer contour of the welding strip to have the same shape as the outer contour of the second crank arm, it is convenient for the second crank arm to be tightly connected to the first crank arm, without causing the second crank arm to be partially warped relative to the first crank arm. For example, the welding strip is located at the edge of the second crank arm, and connected to the edge of the second crank arm with rounded corners, or the welding strip has a certain spacing from the edge of the second crank arm, wherein by default, the welding strip surrounds the opening at one end of the fourth oil passage. In addition, by making the cross section of the welding strip trapezoid-shaped or wedge-shaped, e.g., one side of the welding strip facing the axis of the second shaft is arranged to have an outward wedge shape, it is convenient for the welding strip to be electrically fused into one side of the first crank arm close to the second crank arm to firmly connect the first crank arm and the second crank arm.

In some embodiments, a width of an end surface of the welding strip facing the first crank arm is larger than or equal to 0.2 mm.

In these embodiments, by making the width of an end surface of the welding strip facing the first crank arm not smaller than 0.2 mm, e.g., between 0.5 mm and 0.8 mm, it is ensured that the welding strip can firmly connect the first crank arm and the second crank arm.

In some embodiments, a boss is provided at one end of the first crank arm close to the first shaft. Further, the boss surrounds the first shaft and an annular groove is formed between the boss and the first shaft.

In these embodiments, one end of the first crank arm close to the first shaft is formed with a boss, which facilitates the mounting and positioning of a washer, thereby facilitating the placement of a bearing in the compressor and ensuring that the bearing is perpendicular to the first shaft.

In some embodiments, by making the boss surround the first shaft and forming an annular groove at the intersection of the boss and the outer contour of the first shaft, it is convenient to stably support the bearing. Moreover, the presence of the annular groove facilitates subsequent finishing of the first shaft and can give way to the tool on the one hand; and on the other hand, it reduces the finishing area of the boss, facilitates finishing of the boss and saves cost, as compared with the case where there is no groove between the boss and the first shaft. For example, the boss and the annular groove are present relatively, and the inner surface of the annular groove also has an arc surface, and may also have an edge.

In some embodiments, a height of the boss is larger than 0.5 mm; and/or the depth of the groove is smaller than or equal to 0.8 mm. For example, the height of the boss may be 1 mm, 2 mm, etc., and a depth of the groove may be between 0.2 mm and 0.4 mm, so that the boss has sufficient structural strength to support the bearing and the rotor, and the groove can ensure finishing of the first shaft.

In some embodiments, the first shaft is provided with a first oil hole, and the first oil hole is communicated with the first oil passage; and the second shaft is provided with a second oil hole, and the second oil hole is communicated with the second oil passage.

In these embodiments, by providing a first oil hole communicated with the first oil passage on the first shaft and a second oil hole communicated with the second oil passage on the second shaft, lubricating oil can flow out through the first oil hole and the second oil hole to lubricate the rotor and other structures of the compressor.

The number of first oil holes is one or at least two, and the number of second oil holes is one or at least two.

In some embodiments, a diameter of the first oil hole is larger than or equal to 1.5 mm, and a diameter of the second oil hole is larger than or equal to 1.5 mm, e.g., between 2 mm and 4 mm, ensuring smooth outflow of lubricating oil.

In some embodiments, the first shaft and the second shaft are both low carbon steel shafts or alloy steel shafts, e.g., low carbon alloy steel, which have high structural strength and wear resistance.

An embodiment of the second aspect of the present application proposes a compressor, comprising: the crankshaft in any of the above embodiments.

The compressor proposed in the present application comprises the crankshaft of any of the above embodiments, and therefore has the beneficial effects of any of the above embodiments, which will not be repeated here.

In some embodiments, the compressor further comprises: a housing, a motor, a bearing and a piston. The housing has an oil sump at bottom; the motor is provided in the housing, and a rotor of the motor is sleeved on the first shaft; the bearing is sleeved on the first shaft and is located between the rotor and the first crank arm; and the piston is connected to one end of a connecting rod, and the other end of the connecting rod is connected to the second shaft of the crankshaft. The first shaft can extend into the oil sump, so that lubricating oil enters the second shaft through the first shaft to lubricate the crankshaft and then lubricate the rotor and the connecting rod, so as to improve the lubricating effect of the compressor, reduce wear and improve the service life of the compressor.

In some embodiments, the diameter of the boss of the crankshaft is larger than the diameter of a raceway of the bearing, e.g., by 1 mm to 2 mm, which is conducive to stable support of the bearing and prevents the bearing from moving drastically.

In some embodiments, a chamfer is provided at one end of the first shaft away from the second shaft, and the width of the chamfer is smaller than the wall thickness at any part of the first oil passage, facilitating guiding the mounting of the rotor to the first shaft.

An embodiment of the third aspect of the present application proposes a refrigeration device, comprising: the compressor in any of the above embodiments.

The refrigeration device provided in the present application comprises the compressor of any of the above embodiments, and therefore has the beneficial effects of any of the above embodiments, which will not be repeated herein.

In some embodiments, the refrigeration device further comprises a condenser, a pressure-reducing member and an evaporator. An outlet of the compressor is communicated with an inlet of the condenser; an inlet of the pressure-reducing member is communicated with an outlet of the condenser; an inlet of the evaporator is communicated with an outlet of the pressure-reducing member, and an outlet of the evaporator is communicated with an inlet of the compressor. In this way, the refrigeration and heating cycle is realized, and since the compressor has a relatively long service life, it is conducive to ensuring the service life of the refrigeration system.

Additional aspects and advantages of the present application will become apparent in the following description, or will be understood by the practice of the present application.

BRIEF DESCRIPTION OF THE DRAWINGS

The above and/or additional aspects and advantages of the present application will become apparent and readily understood from the following description of embodiments in conjunction with the drawings, in which.

The corresponding relationship between the reference signs and component names in FIG. 1 to FIG. 8 is as follows:

100 crankshaft, 110 first shaft, 111 first oil passage, 112 thin-walled section, 113 thick-walled section, 114 transition section, 115 first oil hole, 120 first crank arm, 121 third oil passage, 122 boss, 123 groove, 130 second shaft, 131 second oil passage, 132 second oil hole, 140 second crank arm, 141 fourth oil passage, and 142 welding strip.

DETAILED DESCRIPTION OF EMBODIMENTS

In order that the above-mentioned objectives, features and advantages of the present application can be understood more clearly, a further detailed description of the present application will be given below in connection with the accompanying drawings and exemplary embodiments. It should be noted that the embodiments of the present application and the features in the embodiments can be combined with each other if there is no conflict.

In the following description, numerous specific details are set forth in order to provide a thorough understanding of the present application. However, the present application can also be implemented in other manners than those described herein. Therefore, the protection scope of the present application is not limited to the exemplary embodiments disclosed below.

A crankshaft 100 according to some embodiments of the present application is described below with reference to FIG. 1 to FIG. 8. The extension direction of the line with an arrow in FIG. 1 that extends around a first shaft 110 represents the circumferential direction of a first oil passage 111.

Figure 1:
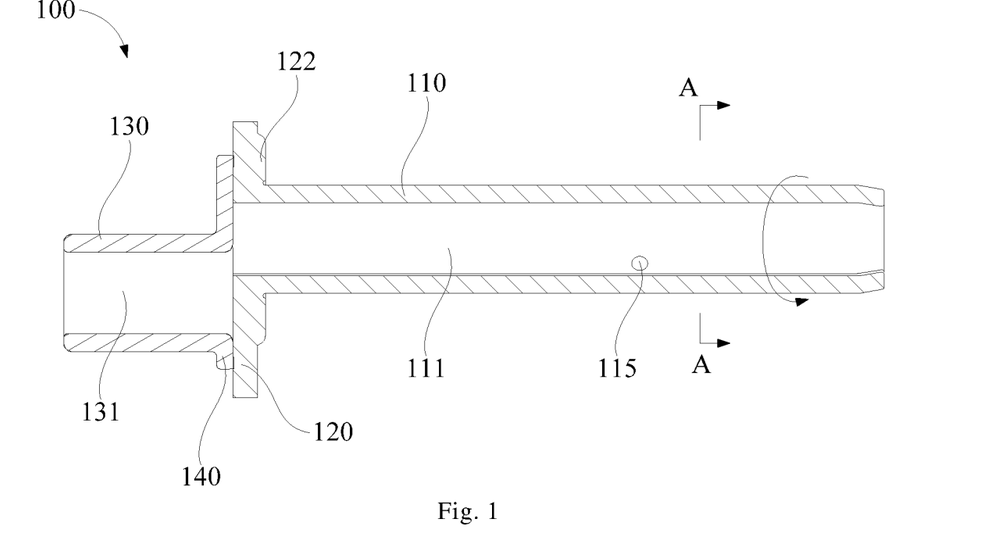
FIG. 1 is a schematic sectional view of a crankshaft according to an embodiment of the present application.

According to an embodiment of the disclosure, the crankshaft 100 comprises a first shaft 110, a second shaft 130 and a first crank arm 120. A first oil passage 111 is formed in the first shaft 110 along an axis direction thereof; a second oil passage 131 is formed in the second shaft 130 along an axis direction thereof; the first crank arm 120 is configured to connect the first shaft 110 and the second shaft 130, the first crank arm 120 is provided with a third oil passage 121, and the third oil passage 121 is configured to communicate the first oil passage 111 with the second oil passage 131. The second shaft 130 is eccentrically provided relative to the axis of the first shaft 110. In any one of cross sections of the first shaft 110, the first oil passage 111 does not have a constant wall thickness.

In this embodiment, by providing the first oil passage 111 in the first shaft 110 along the axis direction thereof and the second oil passage 131 in the second shaft 130 along the axis direction thereof, and making the first oil passage 111 and the second oil passage 131 communicate with each other through the third oil passage 121 on the first crank arm 120, lubricating oil can be supplied to the second oil passage 131 after passing through the first oil passage 111 and the third oil passage 121. The first crank arm 120 is used to connect the first shaft 110 and the second shaft 130. In other words, the second shaft 130 and the first shaft 110 are independent of each other and are separate parts, and are subsequently assembled together through the first crank arm 120. In addition, the second shaft 130 is eccentrically provided relative to the axis of the first shaft 110, i.e., the axis of the second shaft 130 is parallel, but not co-linear, with the axis of the first shaft 110. Thus, it is possible to adjust the eccentricity according to the actual displacement requirements of the compressor, and adjust the relative position of the second shaft 130 and the first shaft 110, to enable the crankshaft 100 to adapt to the displacement requirements of different compressors, which improves the versatility of the parts of the crankshaft 100, and enables oil supply channels and crankshafts 100 with different eccentricity requirements to be processed without the need of processing devices with complex functions or diverse structures, thereby simplifying the processing and reducing the production cost.

Moreover, by providing that in any one of cross sections of the first shaft 110, the first oil passage 111 does not have a constant wall thickness, the centrifugal force generated is not always the same, so that lubricating oil can be applied through a relatively thin-walled part under the action of centrifugal force, and enters the first oil passage 111 and the second oil passage 131 for lubrication, thereby achieving good oiling effect and good lubricating effect. It is worth noting that in the related art, in order to ensure the oiling volume and the structural strength of a crankshaft, the diameter of the crankshaft is designed to be relatively large to enable the oil passage to have a relatively large diameter so as to ensure sufficient centrifugal force and thus ensure the oiling volume. Compared with the practice in the related art, this disclosure can achieve a crankshaft 100 with a small volume while improving the oiling volume of the crankshaft 100 and ensuring the structural strength.

Further, as shown in FIG. 1, the first crank arm 120 is integrally molded with the first shaft 110, e.g., the first crank arm 120 can be integrally forged with the first shaft 110, and the second shaft 130 and the first crank arm 120 are connected together. The molding is simple, the production efficiency and the material utilization rate are high, and the cost can be reduced while ensuring the quality of the parts of the crankshaft 100. Moreover, one set of forging molds can meet the requirements of the crankshafts 100 with different eccentricities, making the molds very versatile and reducing the development costs and the manufacturing costs.

Further, the second shaft 130 and the first crank arm 120 can be welded together by electric resistance welding or electric arc welding.

Figure 2:
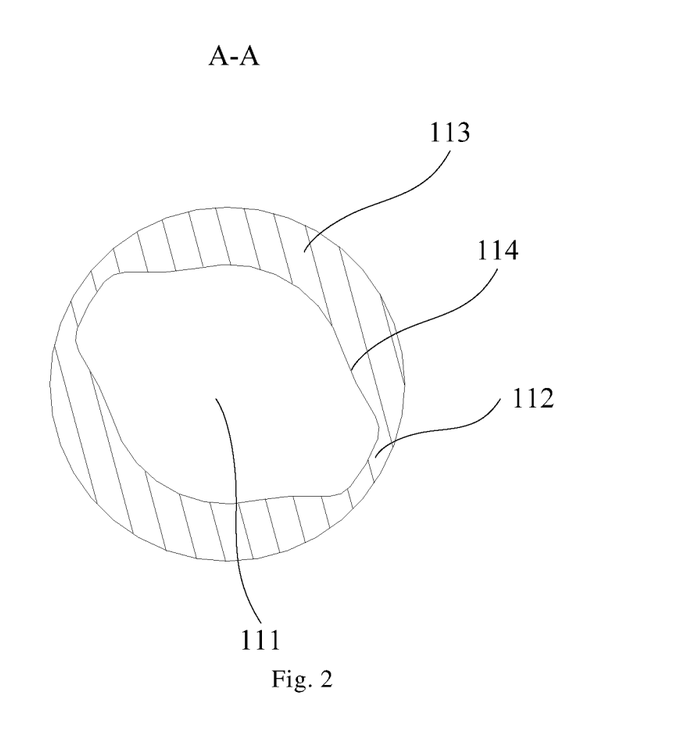
FIG. 2 is a sectional view in the A-A direction of FIG. 1.

According to another embodiment shown in FIG. 1 and FIG. 2, the crankshaft 100 further comprises a second crank arm 140. The first oil passage 111 is formed in the first shaft 110 along an axis direction thereof; the second oil passage 131 is formed in the second shaft 130 along an axis direction thereof; the first crank arm 120 is configured to connect the first shaft 110 and the second shaft 130, the first crank arm 120 is provided with a third oil passage 121, and the third oil passage 121 is configured to communicate the first oil passage 111 with the second oil passage 131; and the second crank arm 140 is configured to connect the second shaft 130 and the first crank arm 120, the second crank arm 140 is provided with a fourth oil passage 141, and the fourth oil passage 141 is configured to communicate the second oil passage 131 with the third oil passage 121. The second shaft 130 is eccentrically provided relative to the axis of the first shaft 110. In any one of cross sections of the first shaft 110, the first oil passage 111 does not have a constant wall thickness.

In this embodiment, the second shaft 130, the second crank arm 140, the first crank arm 120 and the first shaft 110 are connected sequentially. Lubricating oil is made to enter the second oil passage 131 after passing through the first oil passage 111, the third oil passage 121 and the fourth oil passage 141, thereby implementing oiling. The second crank arm can always be disposed on the first crank arm 120 with displacement requirements of different compressors being met, thereby adjusting the eccentricity of the crankshaft 100 and improving the versatility of the parts of the crankshaft 100. Furthermore, the wall thickness of the first oil passage 111 is not always the same at different parts, the centrifugal force generated is not always the same, so that lubricating oil can be applied through a relatively thin-walled part under the action of centrifugal force, and enters the first oil passage 111 and the second oil passage 131 for lubrication, thereby achieving good oiling effect and good lubricating effect.

Figure 5:
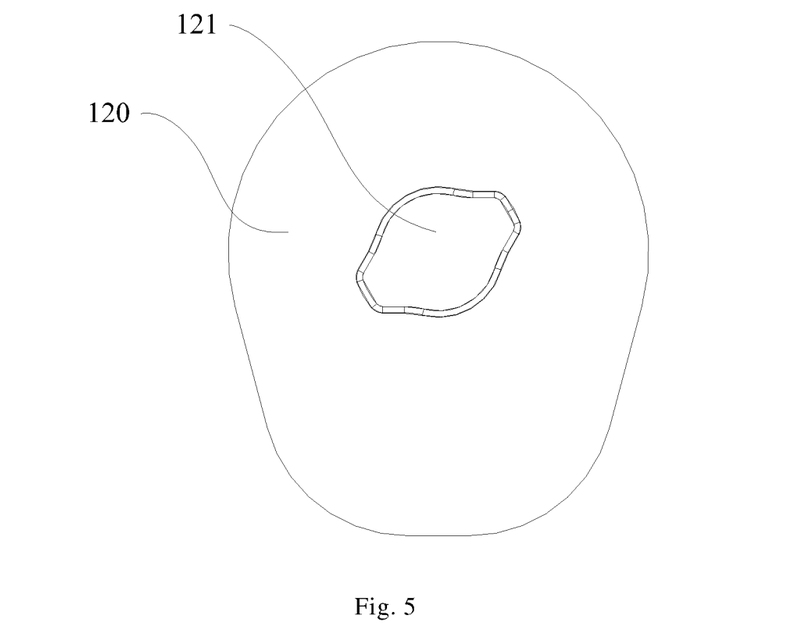
FIG. 5 is a further schematic structural view of the first shaft and the first crank arm according to an embodiment of the present application.

Further, as shown in FIG. 1 and FIG. 5, the third oil passage 121 has the same shape, size and extension direction as the first oil passage 111, and the fourth oil passage 141 has the same shape, size and extension direction as the second oil passage 131, thereby facilitating molding of the first oil passage 111 and the third oil passage 121 in a single process and facilitating molding of the second oil passage 131 and the fourth oil passage 141 in a single process. Moreover, due to the presence of the first crank arm 120 and the second crank arm 140, compared with the case where there is only the first crank arm 120, the third oil passage 121 does not have to be reduced in size for avoiding being exposed in the eccentric setting of the first shaft 110 and the second shaft 130, but can have the same size as the first oil passage 111, thereby ensuring sufficient oiling volume.

Further, the first crank arm 120 can be integrally forged with the first shaft 110, and the second crank arm 140 can be integrally forged with the second shaft 130. In this way, it is possible to quickly realize the first crank arm 120 with certain accuracy and the first shaft 110 with the first oil passage 111, and the second crank arm 140 and the second shaft 130 with the second oil passage 131, which enables direct forging molding of the oil passages, improving the production efficiency.

Alternatively, the first crank arm 120 and the first shaft 110 can also be integrally molded by turning, and the second crank arm 140 and the second shaft 130 can be integrally molded by turning.

Figure 7:
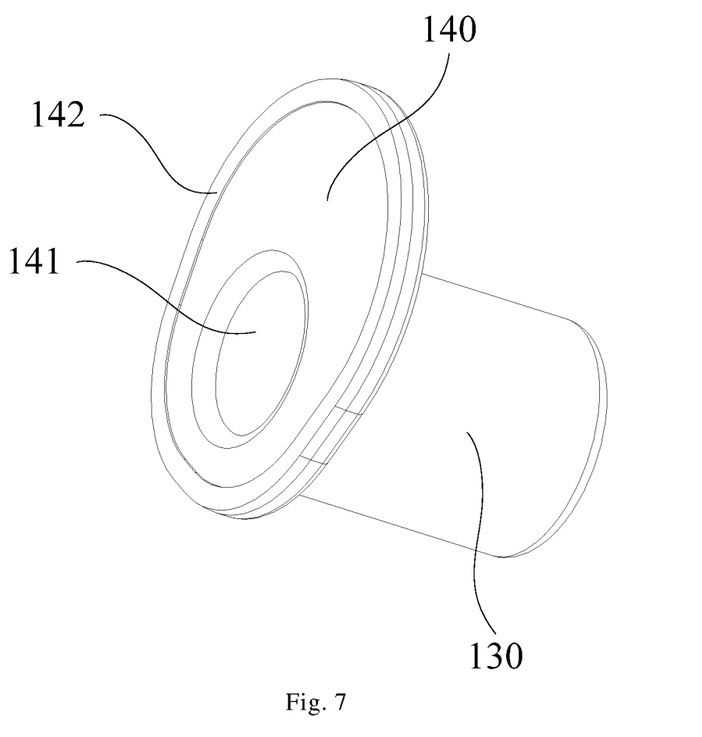
FIG. 7 is another schematic structural view of the second shaft and the second crank arm according to an embodiment of the present application.
Figure 8:
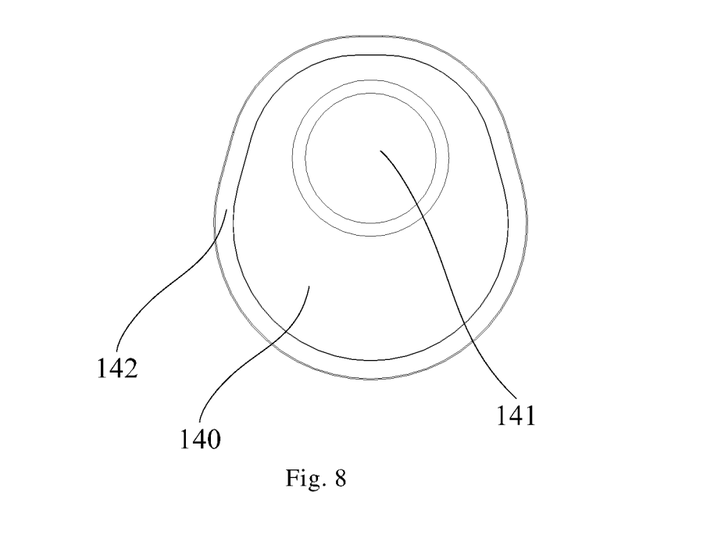
FIG. 8 is a further schematic structural view of the second shaft and the second crank arm according to an embodiment of the present application.

Further, the first crank arm 120 and the second crank arm 140 can be welded together by electric resistance welding. As shown in FIG. 7 and FIG. 8, a welding strip 142 is provided at one end of the second crank arm 140 away from the second shaft 130, and the second crank arm 140 is welded, by electric resistance welding, to the first crank arm 120 through the welding strip 142. In this way, it is convenient to dispose the second crank arm 140 at a position relative to the first crank arm 120 according to different displacement requirements of the compressor. The welding strip 142 can always be included on the first crank arm 120 under all eccentricity conditions of the crankshaft 100. Moreover, due to the presence of the welding strip 142, one end of the second crank arm 140 away from the second shaft 130 forms a recess relative to the welding strip 142, and the fourth oil passage 141 is located within the recess.

Further, as shown in FIG. 7 and FIG. 8, an outer contour of the welding strip 142 has the same shape as an outer contour of the second crank arm 140. The cross section of the welding strip 142 is trapezoid-shaped. The width of an end surface of the welding strip 142 facing the first crank arm 120 is larger than or equal to 0.2 mm. Alternatively, the cross section of the welding strip 142 is wedge-shaped. By setting the outer contour of the welding strip 142 to have the same shape as the outer contour of the second crank arm 140, it is convenient for the second crank arm 140 to be tightly connected to the first crank arm 120, without causing the second crank arm 140 to be partially warped relative to the first crank arm 120. In addition, by making the cross section of the welding strip 142 trapezoid-shaped or wedge-shaped, e.g., one side of the welding strip 142 facing the axis of the second shaft 130 is arranged to have an outward wedge shape, it is convenient for the welding strip 142 to be electrically fused into one side of the first crank arm 120 close to the second crank arm 140 to firmly connect the first crank arm 120 and the second crank arm 140. By making the width of an end surface of the welding strip 142 facing the first crank arm 120 larger than or equal to 0.2 mm, e.g., between 0.5 mm and 0.8 mm (such as 0.6 mm, 0.8 mm, etc.), it can be ensured that the welding strip 142 can firmly connect the first crank arm 120 and the second crank arm 140.

Alternatively, the first crank arm 120 and the second crank arm 140 can also be welded together by electric arc welding, and no welding strip 142 is needed at such a case.

According to another embodiment of the disclosure shown in FIG. 2, it is further defined that in any one of cross sections of the first shaft 110, the first oil passage 111 has a thin-walled section 112 and a thick-walled section 113 in the circumferential direction; and in the circumferential direction of the first oil passage 111, the second shaft 130 is provided eccentrically relative to the axis of the first shaft 110, close to or in the orientation of the thick-walled section 113.

In this embodiment, there are a thin-walled section 112 and a thick-walled section 113 in any one of cross sections of the first shaft 110. The thin-walled section 112 is by default the thinnest section and the section with the largest wall thickness is the thick-walled section 113. That is, the thickness of any thin-walled section 112 is less than the thickness of any thick-walled section 113. The number of thin-walled sections 112 may be one or more, and similarly, the number of thick-walled sections 113 may be one or more. By providing the second shaft 130 eccentrically relative to the axis of the first shaft 110, close to or in the orientation of the thick-walled section 113, in the circumferential direction of the first oil passage 111, i.e., in any one of cross sections of the first shaft 110, the shortest connecting line between the projection of the axis of the second shaft 130 on this cross section and the axis of the first shaft 110 and the shortest connecting line between the projection of the midpoint of the thin-walled section 112 on this cross section and the axis of the first shaft 110 have an angle therebetween, it is possible to prevent the centrifugal force brought by the second shaft 130 from affecting the thin-walled section 112 of the first shaft 110, thereby preventing the thin-walled section 112 from breaking and damaging, etc., and ensuring the structural strength of the thin-walled section 112, thereby further enabling a crankshaft 100 with a small volume to have a relatively high oiling volume.

Further, it is defined that the angle between the above two shortest connecting lines is 90°, 120° or 180°, so that the second shaft 130 is sufficiently spaced from the thin-walled section 112 in the circumferential direction of the first oil passage 111, effectively preventing the eccentric movement of the second shaft 130 relative to the first shaft 110 from affecting the thin-walled section 112 of the first shaft 110, and ensuring that the structural strength of the thin-walled section 112 of the second shaft 130 meets the requirements of the crankshaft 100.

For example, it is defined that in any one of cross sections of the first shaft 110, the first oil passage 111 has an axisymmetric profile hole structure, e.g., an ellipse, a cross pattern, etc.

Further, as shown in FIG. 2, it is defined that an inner contour of the thin-walled section 112 is a first circular arc and an inner contour of the thick-walled section 113 is a second circular arc, the first circular arc and the second circular arc open towards the axis of the first shaft 110.

The wall thickness of the thin-walled section 112 is larger than or equal to 0.3 mm, e.g., between 0.4 mm and 0.5 mm, such as 0.45 mm or 0.6 mm, ensuring that the thin-walled section 112 has sufficient structural strength. The arc length of the first circular arc ranges from 3 mm to 5 mm, e.g., 4 mm or 5 mm, ensuring that the thin-walled section 112 has sufficient oiling volume. The difference between a radius corresponding to the first circular arc and a radius corresponding to the second circular arc ranges from 0 mm to 2 mm, e.g., 1 mm or 1.6 mm, so that sufficient centrifugal force can be generated during the rotation of the first shaft 110 to guide the application of lubricating oil.

Alternatively, it may also be set that the inner contour of the thin-walled section 112 is a third circular arc and an inner contour of the thick-walled section 113 is a fourth circular arc; one of the third circular arc and the fourth circular arc opens towards the axis of the first shaft 110, and the other opens away from the axis of the first shaft 110.

Further, as shown in FIG. 2, the first oil passage 111 further has a transition section 114 connecting the thin-walled section 112 and the thick-walled section 113, and the inner contour of the transition section 114 has a first straight line; and a first tangent is made at the intersection of the first circular arc and the first straight line, a second tangent is made at the intersection of the second circular arc and the first straight line, and an angle between the first tangent and the second tangent facing an interior of the first shaft 110 is larger than 90°, such as 120°, 150°, etc., ensuring that the first oil passage 111 has enough space inside to ensure the oiling volume.

Alternatively, the angle between the first tangent and the second tangent facing the interior of the first shaft 110 may also be smaller than or equal to 90°, such as 60°.

Figure 3:
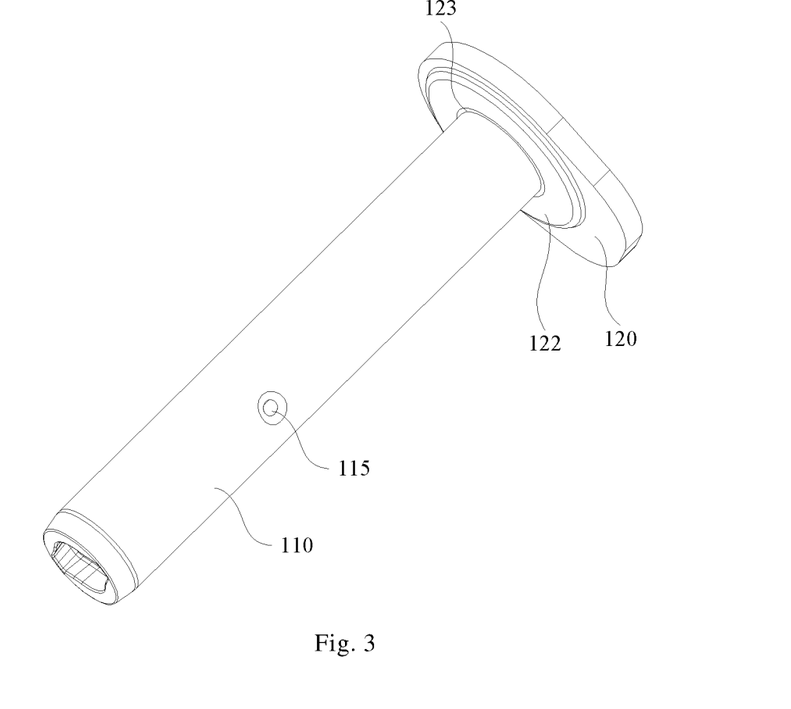
FIG. 3 is a schematic structural view of a first shaft and a first crank arm according to an embodiment of the present application.

According to another embodiment shown in FIG. 3, it is further defined that a boss 122 is provided at one end of the first crank arm 120 close to the first shaft 110; the boss 122 surrounds the first shaft 110, and an annular groove 123 is formed between the boss 122 and the first shaft 110.

In this embodiment, providing the boss 122 facilitates the mounting and positioning of a washer, thereby facilitating the placement of a bearing in the compressor and ensuring that the bearing is perpendicular to the first shaft 110. The presence of the annular groove 123 facilitates subsequent finishing of the first shaft 110 and can give way to the tool on the one hand; and on the other hand, it reduces the finishing area of the boss 122, facilitates finishing of the boss 122 and saves cost, as compared with the case where there is no groove 123 between the boss 122 and the first shaft 110. For example, the boss 122 and the annular groove 123 are present relatively, and the inner surface of the annular groove 123 also has an arc surface, and may also have an edge.

Further, the height of the boss 122 is larger than 0.5 mm; and/or the depth of the groove 123 is smaller than or equal to 0.8 mm. For example, the height of the boss 122 may be 1 mm, 2 mm, etc., and the depth of the groove 123 may be between 0.2 mm and 0.4 mm, so that the boss 122 has sufficient structural strength to support the bearing and the rotor, and the groove 123 can ensure finishing of the first shaft 110.

Figure 4:
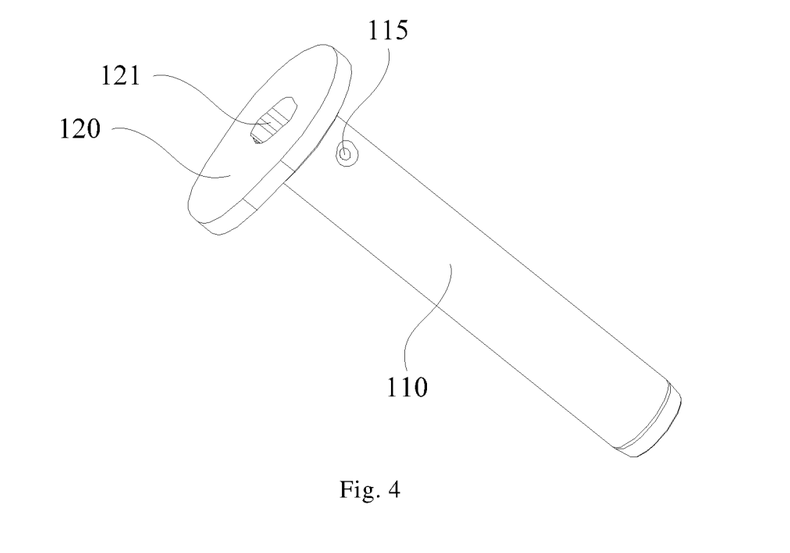
FIG. 4 is another schematic structural view of the first shaft and the first crank arm according to an embodiment of the present application.
Figure 6:
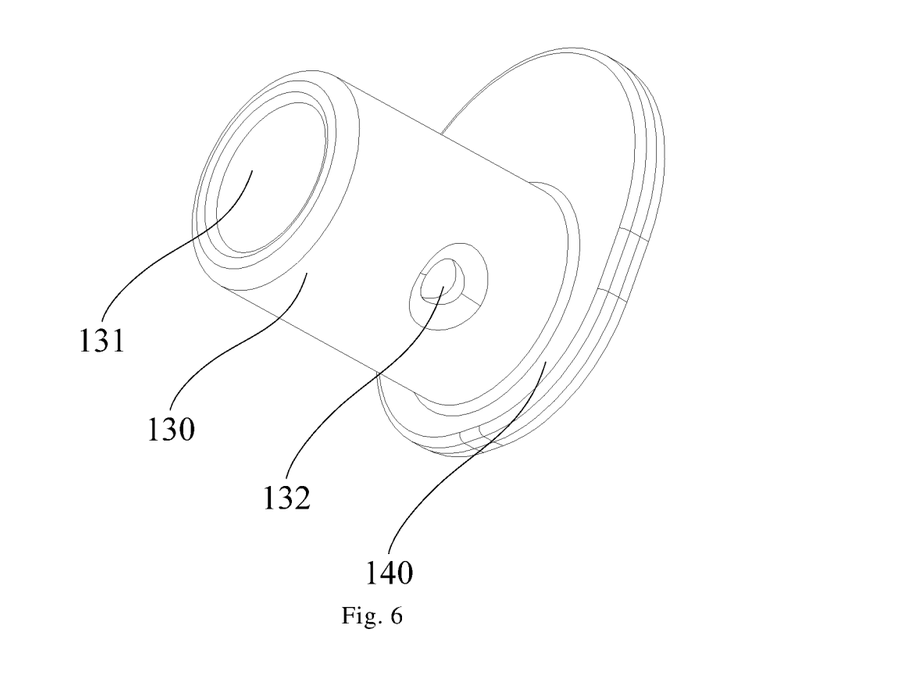
FIG. 6 is a schematic structural view of a second shaft and a second crank arm according to an embodiment of the present application.

Based on any of the above embodiments, as shown in FIG. 4 and FIG. 6, the first shaft 110 is provided with a first oil hole 115, and the first oil hole 115 is communicated with the first oil passage 111; and the second shaft 130 is provided with a second oil hole 132, and the second oil hole 132 is communicated with the second oil passage 131. The diameter of the first oil hole 115 is larger than or equal to 1.5 mm, and the diameter of the second oil hole 132 is larger than or equal to 1.5 mm, e.g., between 2 mm and 4 mm, ensuring smooth outflow of lubricating oil. The first shaft 110 and the second shaft 130 are both low carbon steel shafts or alloy steel shafts, e.g., low carbon alloy steel, which have high structural strength and wear resistance. There is a transition rounded corner at the junction of the first shaft 110 and the first crank arm 120, and there is a transition rounded corner at the junction of the second shaft 130 and the second crank arm 140.

According to another embodiment of the disclosure, a compressor is provided. The compressor comprises the crankshaft 100 in any of the above embodiments, and therefore has the beneficial effects of any of the above embodiments, which will not be repeated here for brevity purpose.

Further, the compressor further comprises: a housing, a motor, a bearing and a piston. The housing has an oil sump at the bottom; the motor is provided in the housing, and a rotor of the motor is sleeved on the first shaft 110; the bearing is sleeved on the first shaft 110 and is located between the rotor and the first crank arm 120; and the piston is connected to one end of a connecting rod, and the other end of the connecting rod is connected to the second shaft 130. The first shaft 110 can extend into the oil sump, so that lubricating oil enters the second shaft 130 through the first shaft 110 to lubricate the crankshaft 100 and then lubricate the rotor and the connecting rod, so as to improve the lubricating effect of the compressor, reduce wear and improve the service life of the compressor.

Further, the diameter of the boss 122 of the crankshaft 100 is larger than the diameter of a raceway of the bearing, e.g., by 1 mm to 2 mm, which is conducive to stable support of the bearing and prevents the bearing from moving drastically.

Further, a chamfer is provided at one end of the first shaft 110 away from the second shaft 130, and the width of the chamfer is smaller than the wall thickness at any part of the first oil passage 111, facilitating guiding the mounting of the rotor to the first shaft 110.

According to another embodiment of the disclosure, a refrigeration device is provided. The refrigeration device comprises the compressor in any of the above embodiments, and therefore has the beneficial effects of any of the above embodiments, which will not be repeated herein for brevity purpose.

Further, the refrigeration device further comprises a condenser, a pressure-reducing member and an evaporator. An outlet of the compressor is communicated with an inlet of the condenser; an inlet of the pressure-reducing member is communicated with an outlet of the condenser; an inlet of the evaporator is communicated with an outlet of the pressure-reducing member, and an outlet of the evaporator is communicated with an inlet of the compressor. In this way, the refrigeration and heating cycle is realized, and since the compressor has a relatively long service life, it is conducive to ensuring the service life of the refrigeration system.

In the present application, the term "a plurality of" means two or more, unless otherwise explicitly defined. The terms "mounting", "connected", "connection", "fixing" and the like should be understood in a broad sense, for example, "connection" may be a fixed connection, and may also be a removable connection, or an integral connection; and "connected" may be direct connection and may also be indirect connection through an intermediary. A person of ordinary skills in the art could understand the specific meaning of the terms in the present application according to specific situations.

In the description of the present specification, the descriptions of the terms "one embodiment", "some embodiments" and "specific embodiments" and the like mean that specific features, structures, materials or characteristics described in conjunction with the embodiment(s) or example(s) are included in at least one embodiment or example of the present application. In the specification, the schematic representation of the above terms does not necessarily refer to the same embodiment or example. Moreover, the particular features, structures, materials or characteristics described may be combined in a suitable manner in any one or more embodiments or examples.

The descriptions above are only preferred embodiments of the present application, which are not used to limit the present application. For a person skilled in the art, the present application may have various changes and variations. Any modifications, equivalent substitutions, improvements etc. within the spirit and principle of the present application shall all be included in the protection scope of the present application.

What is claimed is:
1. A crankshaft comprising:
a first shaft that forms a first oil passage along an axis of the first shaft;
a second shaft that forms a second oil passage along an axis of the second shaft;

a first crank arm disposed between the first shaft and the second shaft that forms a third oil passage in communication with the first oil passage and the second oil passage, wherein:

the first shaft comprises a thin-walled portion and a thick-walled portion;

the axis of the second shaft is offset from the axis of the first shaft; and the first shaft is oriented relative to the second shaft such that a direction of the offset goes through the thick-walled portion; and a second crank arm disposed between the second shaft and the first crank arm that forms a fourth oil passage in communication with the second oil passage and the third oil passage.

2. The crankshaft according to claim 1, wherein:

the first crank arm and the first shaft are integrally molded;

the second crank arm and the second shaft are integrally molded; and the first crank arm and the second crank arm are connected together.

3. The crankshaft according to claim 2, wherein the first crank arm and the second crank arm are welded together via a welding strip at one end of the second crank arm away from the second shaft.

4. The crankshaft according to claim 3, wherein:

a contour of the welding strip corresponds to an outer contour of the second crank arm; and/or a cross section of the welding strip is trapezoid-shaped or wedge-shaped.

5. The crankshaft according to claim 3, wherein a width of the welding strip is larger than or equal to 0.2 mm.

6. The crankshaft according to claim 1, wherein:

an inner profile of the thin-walled portion includes a first circular arc and an inner profile of the thick-walled portion includes a second circular arc; and the first circular arc and the second circular arc are concave towards the axis of the first shaft.

7. The crankshaft according to claim 6, wherein:

a wall thickness of the thin-walled portion is larger than or equal to 0.3 mm; and/or an arc length of the first circular arc is between 3 mm and 5 mm; and/or a difference between a radius of the first circular arc and a radius of the second circular arc is between 0 mm and 2 mm.

8. The crankshaft according to claim 6, wherein:

the first shaft comprises a transition portion connecting the thin-walled portion and the thick-walled portion; and an inner profile of the transition portion includes a straight line.

9. The crankshaft according to claim 1, wherein:

an inner profile of the thin-walled portion includes a first circular arc;

an inner profile of the thick-walled portion includes a second circular arc; and one of the first circular arc and the second circular arc opens towards the axis of the first shaft and another of the first circular arc and the second circular arc opens away from the axis of the first shaft.

10. The crankshaft according to claim 1 wherein the first crank arm comprises a boss at an end of the first crank arm close to the first shaft;

the boss surrounds the first shaft; and the boss forms at least part of an annular groove between the first crank arm and the first shaft.

11. The crankshaft according to claim 10, wherein:

a height of the boss along the axis of the first shaft is larger than 0.5 mm; and/or a depth of the groove along the axis of the first shaft is smaller than or equal to 0.8 mm.

12. The crankshaft according to claim 1, wherein:

the first shaft forms a first oil hole that communicates with the first oil passage; and the second shaft forms a second oil hole that communicates with the second oil passage.

13. The crankshaft according to claim 12, wherein:

a diameter of the first oil hole is larger than or equal to 1.5 mm; and a diameter of the second oil hole is larger than or equal to 1.5 mm.

14. The crankshaft according to claim 1, wherein the first shaft and the second shaft are formed of low carbon steel or alloy steel.

15. A compressor comprising the crankshaft according to claim 1.

16. A refrigeration device comprising the compressor according to claim 15.

17. A crankshaft comprising:

a first shaft that forms a first oil passage along an axis of the first shaft;

a second shaft that forms a second oil passage along an axis of the second shaft; and a first crank arm disposed between the first shaft and the second shaft that forms a third oil passage in communication with the first oil passage and the second oil passage, wherein:

the first shaft comprises a thin-walled portion and a thick-walled portion;

the axis of the second shaft is offset from the axis of the first shaft;

the first shaft is oriented relative to the second shaft such that a direction of the offset goes through the thick-walled portion;

an inner profile of the thin-walled portion includes a first circular arc and an inner profile of the thick-walled portion includes a second circular arc; and the first circular arc and the second circular arc are concave towards the axis of the first shaft.

18. A crankshaft comprising:

a first shaft that forms a first oil passage along an axis of the first shaft;

a second shaft that forms a second oil passage along an axis of the second shaft; and a first crank arm disposed between the first shaft and the second shaft that forms a third oil passage in communication with the first oil passage and the second oil passage, wherein:

the first shaft comprises a thin-walled portion and a thick-walled portion;

the axis of the second shaft is offset from the axis of the first shaft;

the first shaft is oriented relative to the second shaft such that a direction of the offset goes through the thick-walled portion;

an inner profile of the thin-walled portion includes a first circular arc;

an inner profile of the thick-walled portion includes a second circular arc; and one of the first circular arc and the second circular arc opens towards the axis of the first shaft and another of the first circular arc and the second circular arc opens away from the axis of the first shaft.

\* \* \* \* \*